United States Patent [19]
Newton

[11] Patent Number: 5,926,576
[45] Date of Patent: *Jul. 20, 1999

[54] IMAGING METHOD AND SYSTEM CONCATENATING IMAGE DATA VALUES TO FORM AN INTEGER, PARTITION THE INTEGER, AND ARITHMETICALLY ENCODE BIT POSITION COUNTS OF THE INTEGER

[76] Inventor: Dale C. Newton, 4150 Arkwright Rd., Bldg. 10, Apt. 102, Macon, Ga. 31210

[*] Notice: This patent is subject to a terminal disclaimer.

[21] Appl. No.: 08/773,407

[22] Filed: Dec. 27, 1996

Related U.S. Application Data

[63] Continuation-in-part of application No. 08/219,827, Mar. 30, 1994, Pat. No. 5,590,221.

[51] Int. Cl.⁶ ............................................. G06T 9/00
[52] U.S. Cl. ..................... 382/247; 382/233; 382/237; 382/244; 382/305; 341/60; 341/107
[58] Field of Search ........................ 382/247, 232, 382/233, 244, 302, 305, 237, 246, 245; 341/60, 107, 65, 67, 56; 358/426, 427, 429, 455; 348/387; 345/202, 203

[56] References Cited

U.S. PATENT DOCUMENTS

| | | | |
|---|---|---|---|
| 5,577,132 | 11/1996 | Yokose et al. | 382/238 |
| 5,587,798 | 12/1996 | Kurita et al. | 358/261.1 |
| 5,590,221 | 12/1996 | Newton | 382/232 |
| 5,673,209 | 9/1997 | Heiney et al. | 364/715.02 |
| 5,675,789 | 10/1997 | Ishii et al. | 707/204 |
| 5,677,728 | 10/1997 | Schoolman | 348/19 |
| 5,684,603 | 11/1997 | Katsuno et al. | 358/433 |
| 5,686,914 | 11/1997 | Okunoki | 341/59 |
| 5,687,259 | 11/1997 | Linford | 382/294 |
| 5,835,034 | 11/1998 | Seroussi et al. | 341/65 |

*Primary Examiner*—Edward L. Coles
*Assistant Examiner*—David Rosenblum
*Attorney, Agent, or Firm*—Charles A. McClure

[57] ABSTRACT

Extended lossless imaging method and system, useful for medical and other imaging, where a succession of values of optical density or other feature of interest may be obtained by scanning an image as an array, or may be selected otherwise. Image data values in binary form are linked end to end into a concatenated number, partitionable into a set of ordered (non-repeating) numerical terms summing to it. Position counts of such a concatenated number also may be summed, as to give a "characteristic" whole part of a real number, and may be encoded arithmetically to give a "mantissa" fractional part thereof. The derived numbers are electronically stored for retrieval directly or by reverse computation, to yield reconstituted image data values, from which a lossless replica of the original image is readily made.

1 Claim, 11 Drawing Sheets

FIG. 2

DECIMAL

| 1 | 2 |
|---|---|
| 4 | 3 |

BINARY (8-BIT)

| 00000001 | 00000010 |
|---|---|
| 00000100 | 00000011 |

SCAN ARRAY FROM CELL 1:

ARRAYED VALUES (A) 1,2,3,4 (CLOCKWISE)
00000001, 00000010, 00000011, 00000100

(B) 1,4,3,2 (COUNTER CLOCKWISE)
00000001, 00000100, 00000011, 00000010

(C) 1,2,4,3 (ROWS, LEFT TO RIGHT)
00000001, 00000010, 00000100, 00000011

(D) 1,4,2,3 (COLUMNS, DOWN)
00000001, 00000100, 00000010, 00000011

(E) 1,3,2,4 (DIAGONALS, DOWN)
00000001, 00000011, 00000010, 00000100

(F) 1,3,4,2 (DIAGONALS DOWN, DIAGONALS UP)
00000001, 00000011, 00000100, 00000010

ALSO SIX SIMILAR SCANS FOR THIS ARRAY STARTING FROM EACH OTHER CELL.

INTEGER '15'

Partition Sequences

| #1 | 1, 2, 3, 4, 5 |
|---|---|
| #2 | 1, 2, 3, 9 |
| #3 | 1, 2, 4, 8 |
| #4 | 1, 2, 5, 7 |
| #5 | 1, 2, 12 |
| #6 | 1, 3, 4, 7 |
| #7 | 1, 3, 5, 6 |
| #8 | 1, 3, 11 |
| #9 | 1, 4, 10 |
| #10 | 1, 5, 9 |
| #11 | 1, 6, 8 |
| #12 | 1, 14 |
| #13 | 2, 3, 4, 6 |
| #14 | 2, 3, 10 |
| #15 | 2, 4, 9 |
| #16 | 2, 5, 8 |
| #17 | 2, 6, 7 |

| #18 | 2, 13 |
|---|---|
| #19 | 3, 4, 8 |
| #20 | 3, 5, 7 |
| #21 | 3, 12 |
| #22 | 4, 5, 6 |
| #23 | 4, 11 |
| #24 | 5, 10 |
| #25 | 6, 9 |
| #26 | 7, 8 |
| #27 | 15 | total = 80

| Symbol | Probability |
|---|---|
| 1 | 0.15 |
| 2 | 0.1375 |
| 3 | 0.125 |
| 4 | 0.1125 |
| 5 | 0.10 |
| 6 | 0.075 |
| 7 | 0.0625 |
| 8 | 0.0625 |
| 9 | 0.05 |
| 10 | 0.0375 |
| 11 | 0.025 |
| 12 | 0.025 |
| 13 | 0.0125 |
| 14 | 0.0125 |
| 15 | 0.0125 |

FIG. 5

Formation of CADAMA Characteristic

Convert Decimal Values 1, 3, 5, 6 to Binary Values

Concatenate the Binary Values:

00000001,00000011,00000101,00000110

Find position value of symbol 1, reading left to right:

8, 15, 16, 22, 24, 30, 31

Sum the values: 8 + 15 + 16 + 22 + 24 + 30 + 31

= CADAMA Characteristic: 146.

FIG. 7

SCATTERPLOT EXAMPLE

| MONTH | PAST | FUTURE |
|---|---|---|
| 1<br>00000001 | 3<br>00000011 | 5<br>00000101 |
| 2<br>00000010 | 2<br>00000010 | 4<br>00000100 |
| 3<br>00000011 | 7<br>00000111 | 6<br>00000110 |
| 4<br>00000100 | 4<br>00000100 | 7<br>00000111 |
| 5<br>00000101 | 8<br>00001000 | 9<br>00001001 |
| 6<br>00000110 | 5<br>00000101 | 6<br>00000110 |

IMAGING METHOD AND SYSTEM CONCATENATING IMAGE DATA VALUES TO FORM AN INTEGER, PARTITION THE INTEGER, AND ARITHMETICALLY ENCODE BIT POSITION COUNTS OF THE INTEGER

This is a continuation-in-part of my pending application Ser. No. 08/219,827 filed Mar. 30, 1994 and now U.S. Pat. No. 5,590,221.

TECHNICAL FIELD

This invention relates to lossless imaging of medical or other perceptible data, including analog-to-digital (A/D) and/or digital-to-analog (D/A) data conversion, and/or other data coding/decoding.

BACKGROUND OF THE INVENTION

Medical advances plus computer improvements have facilitated medical image storage and retrieval. Whether images are derived as analog or digital data, and regardless of diverse methods of their origination, their computer storage in digital form is customary, even though film or paper copies may be made and stored as well.

Conversion of analog data to digital (A/D) is common, whereupon reconversion from digital data to analog (D/A) is customary—as is D/A conversion of data originated in digital form. The human eye and brain are especially well suited to detecting and interpreting fine gradations in analog images, whereas computers are especially adapted to high-speed processing of digital data.

Conversion and transmittal of data are susceptible to error. Unlike reproduced entertainment images, a reproduced medical image, for example, requires a higher level of identity with the original, or a critical aspect may become degraded in its image reproduction.

Yet methods of image conversion or of storage and retrieval may be required to handle such large volumes of data that toleration of errors may tend to become an accepted trade-off for prompt handling.

Examples of common imaging problems and remedies for them are considered in U.S. patents, as by Ichihara in U.S. Pat. No. 4,864,500; Hopkinson in U.S. Pat. No. 4,939,645; Tawara et al. in U.S. Pat. No. 4,958,283; and John in U.S. Pat. No. 5,027,817.

My identified patent teaches concatenation of individually digitized values of interest into a large integer, plus arithmetic partitioning of it into a set of terms (summands) for storage and/or further processing. Such a stored integer can be recovered and, if desired, reconverted to equivalent analog values without coarsening or loss of image detail.

The present invention extends that lossless imaging method to lossless processing of any interrelated data, including additional coding/decoding methods besides A/D and D/A conversion/reconversion.

SUMMARY OF THE INVENTION

My invention provides methods for substantially lossless data conversion, storage, and retrieval, especially—but not exclusively—useful in medical imaging, as by a digital processing system.

A primary object of the present invention is to process image data so as to enable an image to be replicated extremely accurately.

Another object of this invention is to provide novel numeric methods of representing an image and of processing a variety of such numeric representations for storage and retrieval of the image.

A further object of the invention is to provide for detection and correction of errors arising in data conversion or transmission.

Yet another object of this invention is lossless storage of all types of related data in numerical form for lossless retrieval.

A still further object of this invention is to provide lossless computer-assisted data and methods analysis techniques.

In general, the objects of this invention are achieved, in data transformation, by concatenating discrete items of data into one or more orderly sets losslessly indicative of the given starting data. Such concatenated data set is converted for storage and subsequently reconverted for retrieval—including provision for cross-comparing aspects of each such data set, and correcting any error so detected.

For example, a feature of interest, such as optical density, is measured (i.e., evaluated) at successive locations within an image field, as via an orderly array scanning method. The image array may be mainly one-dimensional and/or linear, as in the instance of text, but usually occupies two or more dimensions (e.g., x-ray radiograph, CAT scan, or MRI scan), especially where a physiological process, such as blood circulation or cell division, is being observed over an additional spatial or a non-spatial dimension (e.g., time).

Values not already digital are converted from analog to digital (A/D) form for readier processing. Successive resulting image data values from a convenient scanning path (part/all of an image field) and duration (e.g., milliseconds or microseconds) are concatenated (linked end-to-end) to form image data numbers for further processing according to the invention. Successive numbers are concatenated to form, for example, one or more integral numbers, partitionable into one or more sets of such numbers summable to integral numbers. Alternative partitionings of a single image data integral number can enable subsequent cross-checking for error-detection and correction.

Also for purposes of error detection/correction, and otherwise, such concatenated number is convertible by a new number-theoretic computational method into "characteristic" and "mantissa" parts losslessly storable and retrievable to reproduce the image exactly.

At retrieval each data value is readily reconstituted, by doing essentially the inverse of the storage procedure already described. Replication of the associated values of the optical density or other attribute of interest at the corresponding pixel locations is achieved by conversion from digital to analog data, retracing of the scanning path throughout the array, and placing individual values at the allotted locations. The resulting image may be displayed in transitory form, (e.g., on a video screen) or in a more nearly permanent form (e.g., as a printout on paper or film). This procedure gives an identical likeness or replica of the given original image field. The image resolution is dependent upon the instrumental granularity (e.g., 8-bit, 16-bit, 32-bit, 64-bit, or higher).

The invention also includes steps of error detection/correction performable upon image data values in numerical form, before or after A/D conversion or D/A re-conversion (or both), to preclude the acceptance of retrieved versions if erroneous or incomplete. With a succession of values obtained by one pattern of scanning throughout an image field, values from that pattern may be compared with the values from another scanning pattern of the same array, offsetting those differences due to scanning order. Correction is conveniently based on cross-checking comparison of outcomes of alternative paths to an error locus, with corroboration from their mutual agreement.

Other objects of the present invention, together with means and methods for attaining the various objects, will become apparent from the following description and the accompanying diagrams of preferred embodiments presented here by way of example rather than limitation.

SUMMARY OF THE DRAWINGS

FIG. 2 is a schematic showing of a 2×2 image matrix, together with numerical versions of results of different scanning orders.

FIG. 5 provides a table of partition sequences for the integer 15, and a probability table for the respective component summands;

FIG. 7 shows schematically the formation of the characteristic integer portion of a computational number from given values of FIG. 5.

FIG. 9 is a value table for a three-dimensional scatterplot in (x, y, z) configuration;

DESCRIPTION OF THE INVENTION

This invention utilizes the concept of partitioning an integer into a set of smaller integers "restricted" to no more than a single occurrence each and called "terms" (or "summands")—whose sum equals the partitioned number. For example, the numbers 1, 2, 3, 4, and 5 in our usual decimal system add up to the number 15 and constitute a restricted partition of that larger number. They are uniquely its fundamental partition, a closed or "fully packed" sequence, starting at 1. Other restricted partitions of the number 15 (made up of two or more integers smaller than 15) include looser sequences, such as (i) 3, 4, 8; and (ii) 6, 9. As shown in FIG. 5, considered further below, 15 has more than two dozen such partitions, each conveniently represented as terms arranged in order (monotonic) along a number line or spectrum in a preferred number base. The usual bases are decimal and binary. Bases such as 8 (octal), 12 (duodecimal) or 16 (hexadecimal), can be useful in error detection/correction, etc.

More compact shorthand representation of partitions is useful. A preferred notation is $[n,N]_{alpha}^{omega}$ where n is the number of terms, N the partitioned number, alpha and omega the first and last terms. The five-member (1, 2, 3, 4, 5) partition of 15 is $[5,15]_1^5$, whereas the other two examples above are (i) $[3,15]_3^8$ and (ii) $[2,15]_6^9$. The first partition is packed (i.e., no number is omitted from alpha to omega) readily indicated by underlining between the brackets, thus: $[\underline{5,15}]_1^5$. As its alpha=1, this partition is also fully packed. With n such terms, $(n^2+n)/2$ equals N; so $(5^2+5)/2=30/2=15$. Integers suffice as exemplary here; fractions can be handled as reciprocal terms; and negative numbers can be treated separately by prefixing a negative sign to each such number.

FIGS. 1 to 4 illustrate a first embodiment of this invention, wherein an image field is scanned as an array (e.g., orthogonal x,y) in a selected order of picture elements (pixels) by suitable sensing means whose granularity matches the desired image resolution. Evaluation of sensed data gives measured values for respective pixel locations, and a succession of values for the entire array. Sensed analog values are converted into the corresponding digital values. A commonly sensed attribute is optical density—for which the scanning sensor is a photodiode or the like. Other attributes for such sensing include color, conductivity (electrical or thermal) and temperature, for all of which suitable sensors are well known.

Figure 1:
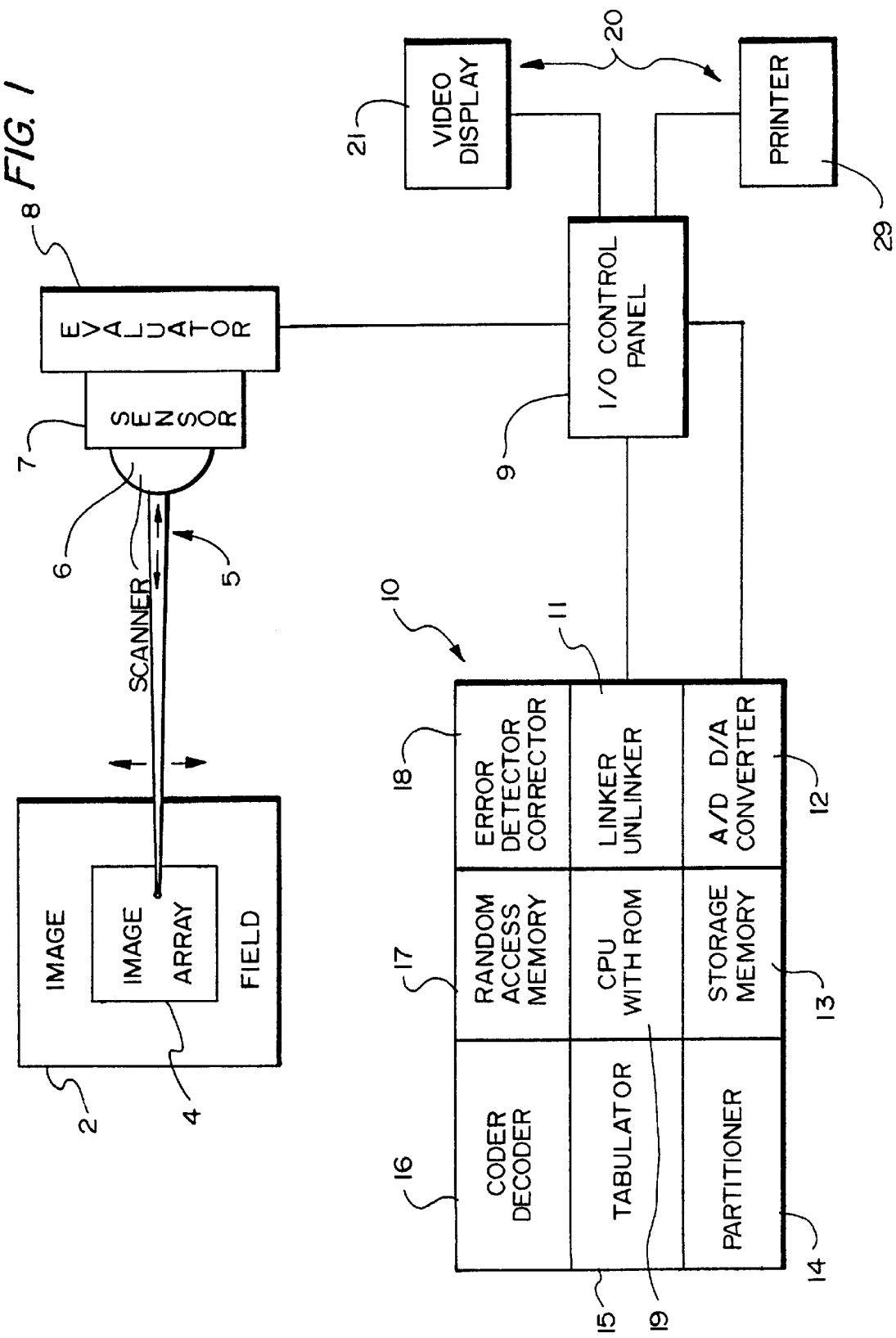
FIG. 1 is a largely schematic or block diagram of apparatus components useful in practicing the steps of the present invention.

FIG. 1 shows schematically apparatus of the present invention, including interconnected (i) imaging components group 5 (along top); (ii) storage, computation, and retrieval components group 10 (at the lower left; and (iii) display components group 20 (at lower right). IMAGE FIELD 2 (at the upper left) is subdivisible into one or more scannable portions—one being identified here as IMAGE ARRAY 4—by SCANNER 6, itself adapted to sweep arrays as a succession of pixels in an ordered manner, such as horizontally and vertically (arrows). SENSOR 7 and EVALUATOR 8 are adapted to measure numerically a given attribute of interest at each successive pixel scanned and thus to output a resulting succession of numerical image data. Streams of image data from imaging components group 5 are fed to components group 10—often called simply "the computer" here—via intervening I/O CONTROL PANEL 9, which enables an operator to direct and review computer operations and to select and view image displays.

In FIG. 1, a stream of image data is forwarded from the CONTROL PANEL to the computer via LINKER/UNLINKER 11 (adapted to concatenate it) and/or by A/D D/A CONVERTER 12 (adapted to convert to a preferred number base—usually binary—whatever input image data may be in non-preferred form). In addition to the two last mentioned components, the computer group comprises basic component 19: CPU (central processing unit) with ROM (read-only memory), and STORAGE MEMORY 13, and also RANDOM ACCESS MEMORY (RAM) 17. RAM is a transitory working space, whereas ROM is a permanent source of control data or directions, and the other memory is a semi-permanent repository of image-related data.

Adjunct components for numerical processing include PARTITIONER 14, TABULATOR 15, CODER/DECODER 16, and ERROR DETECTOR/CORRECTOR 18, including well known comparator circuitry useful for such purposes.

Also connected to the computer via I/O CONTROL PANEL 9 are VIDEO DISPLAY 21 and PRINTER 29 as examples of display means upon which the operator and others can view resulting images, as well as operational information about the imaging system and its operation.

FIG. 2 shows values obtainable from scanning a two-by-two image array with values 1, 2, 3, 4 in upper left, upper right, lower right, and lower left cells. That ordered (monotonic) sequence can be obtained by scanning the array clockwise, alternating direction row-by-row between left-to-right and right-to-left (no fly-back). If scanned counter-clockwise, from the same upper left cell, the order would become 1, 4, 3, 2; row-by-row, left-to-right, would become 1, 2, 4, 3; column-by-column from top-to-bottom and left-to-right would yield 1, 4, 2, 3; criss-cross could give 1, 3, 2, 4 and 1, 3, 4, 2. Each value (other than 1), when considered as the initial starting point, gives six more sequences (twenty-four total). Each FIG. 2 sequence can be considered a single number, as could subsets of any such sequence or supersets composed of a multiplicity of sequences wherein this four-numbered array may be only one of many to be processed similarly.

FIG. 2 shows in schematic and tabular form ARRAYED VALUES from scanning a simple 2×2 array, shown in decimal form at the top left (1, 2, 3, 4 when read in clockwise order from the upper left cell) and in corresponding 8-bit binary form at the upper right. Tabulated are resulting numerical value sequences resulting from the available six scanning patterns, the decimal values in a column at the left, with the scanning patterns, and binary values arrayed at the right.

The half dozen possible decimal sequences (from the upper left) are (a) 1,2,3,4; (b) 1,4,3,2; (c) 1,2,4,3; (d) 1,4,2,3; (e) 1,3,2,4; and (f) 1,3,4,2. The corresponding binary sequences are longer: (a) 00000001, 00000010, 00000011, 00000100; (b) 00000001, 00000100, 00000011, 00000010; (c) 00000001, 00000010, 00000100, 00000011; (d) 00000001, 00000100, 00000010, 00000011; (e) 00000001, 00000011, 00000010, 00000100; and (f) 00000001, 00000011, 00000100, 00000010.

It will be apparent that an equal number of sequences (six) would be generated by starting at another cell value, where-upon the initial values of those sequences would be, respectively, 2, 3, and 4 (decimal)—and the corresponding values in binary notation. Another numeric base, such as hexadecimal, might be used if desired.

One aspect of the invention is concatenation or linking of the sequences of image data numeric values into larger integral numbers, each resulting integer corresponding to one or more array sequences. Once concatenation of the numeric values from scanning of a four-cell array is understood, concatenation of longer array sequences or of multiple arrays should be readily apparent.

For the FIG. 2 sequence (a) the concatenated decimal number would be 1234, whereas the corresponding concatenated binary number is 00000001000000100000001100000100, equal to decimal 33,818,120—as the sum of binary values for each "1" in the sequence (from least significant digit, at right in binary—as in decimal—notation) is $2^3, 2^9, 2^{10}, 2^{18}, 2^{25}$=(8+512+1024+262,144+33,554,432). The positional sequence of either zero or non-zero digits is usable in error detection/correction, a subject considered further below.

A preferred method for partitioning linked numbers derived from the matrix in FIG. 2 (1234, 1243, 1324, 1342, 1423, 1432) follows. By assumption, the lowest numeric value allowable in any partition is one, and the highest value is the last term in the next higher fully packed partition—which for the first two numbers is 1275(fully packed at 50 terms), for the third number is 1326 (fully packed at 51 terms), for the fourth number is 1378 (fully packed at 52 terms), for the fifth number is 1431 (fully packed at 53 terms), and for the sixth number is 1485 (fully packed at 54 terms).

Each partition is to be packed from the highest term downward until the next term would exceed the number being partitioned, then that term is skipped, and the highest possible smaller terms are selected to make up the rest of the number being partitioned—which they do in patterned ways from number to adjacent number.

For the first two numbers, 1234 and 1243, terms to be omitted must total 41 (=1275–1234) and 32 (=1275–1243), respectively. As the partition of 36 is fully packed by 1, 2, 3, 4, 5, 6, 7, and 8, inclusion of the single term 4 from the sequence of terms 1 to 8, to give the sequence 4, 9, 10, 11 , . . . 50, partitions the number 1243 and can be represented by $[43,1243]_4^{50}$. Similarly, the fully packed nine-term partition for the number 45 is four more than need be omitted, so inclusion of 4 from it in the sequence 4, 10, 11 . . . 50 partitions the number 1234 and can be represented as $[42,1234]_4^{50}$.

In like manner partitions can be derived for the other numbers. For 1324 the partition is 1, 3, 4 . . . 51 represented as $[50,1324]_1^{51}$. For 1342 the partition is 9, 10 . . . 52, represented as $[44,1342]_9^{52}$. For 1423 the partition is 1, 2 . . . 7, 9, 10 . . . 53, or $[52,1423]_1^{53}$, and for 1432 the partition is 2, 11, 12 . . . 54, or $[45,1432]_2^{54}$.

The bracketed representations of the numbers correspond to the relatively small amount of information required to be input to store the terms making up the partitioning of the numbers. This method of coding the data to be stored is simple, efficient, and lossless. Of course, alternative partitioning procedures may be used to similar effect. Additionally, recurrent numbers may be partitioned in a given manner each time, or—if desired to be distinguished—may be allocated different partitioning procedures from a set thereof upon each successive occurrence in the same batch of data.

Subsequently another method of processing concatenated values will be considered below, which gives rise to another presentation that may be used to supplement the foregoing method, as for error detection and correction, or optionally to be used independently.

Figure 3:
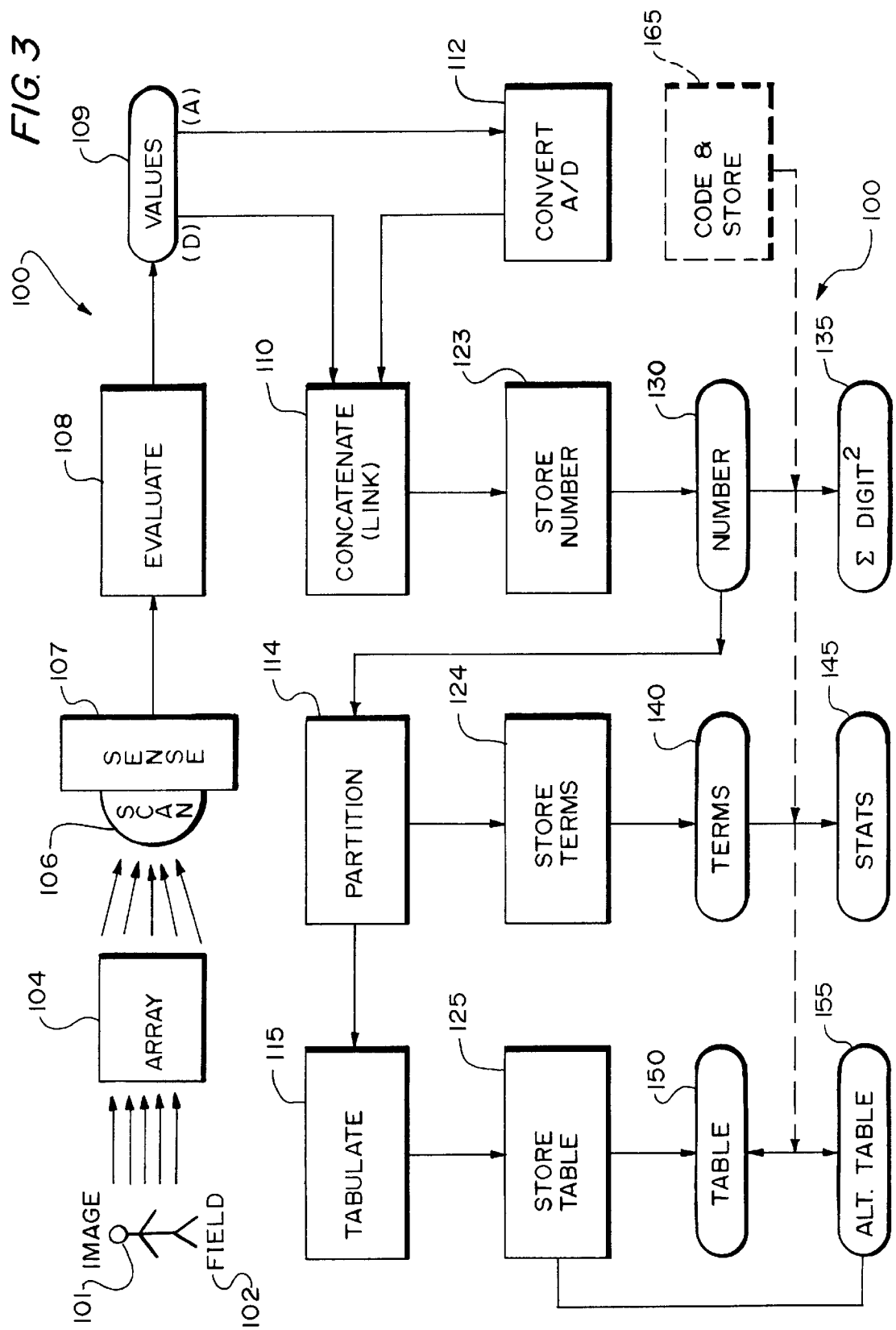
FIG. 3 is a schematic flow diagram representative of steps of this invention to and including storage of image data.

FIG. 3 shows, in schematic flow diagram form, the main steps of an embodiment of image-input or storage method 100 of the invention. Basic steps are to SCAN 106 IMAGE FIELD 102 containing something of interest, represented by stick FIG. 101, as an ARRAY 104 of picture elements (pixels), and to SENSE 107 at each pixel an attribute of interest, and also to EVALUATE 108 the sensed attribute numerically—as analog (A) or digital (D)—VALUES 109 thereof. The next steps according to this invention are to CONCATENATE 110 the numerical values, and (if analog) to CONVERT A/D 112 (to digital), also to STORE NUMBER 123, the number itself denoted as NUMBER 130.

Further steps in FIG. 3 are to PARTITION 114 stored NUMBER 130 into an ordered set of numerical terms that sum to that number, to STORE TERMS 124 (that specific set) as TERMS 140, also to TABULATE 115 the terms, and to STORE TABLE 125 of them as TABLE 150. Common coding (e.g., compression) may be performed here mainly to conserve storage space, but here coding means primarily derivative processing such as may be especially conducive to error detection/correction. Such steps (dashed lines) include CODE & STORE 165—derivatives thereof, such as $\Sigma DIGIT^2$ 135 (sum of squared non-zero digits of NUMBER 130), STATS 145 from statistical analysis of TERMS 140 (such as their mean and standard deviation or variance), and/or alternative table ALT. TABLE 155 derived from TERMS 140 by at least one other method, such as bottom-up (instead of top-down) partition packing, or change in either actual or computed scanning order. Subsequent decoding may—but need not—be deferred until retrieval, considered in the following description of the next numbered diagram.

Figure 4:
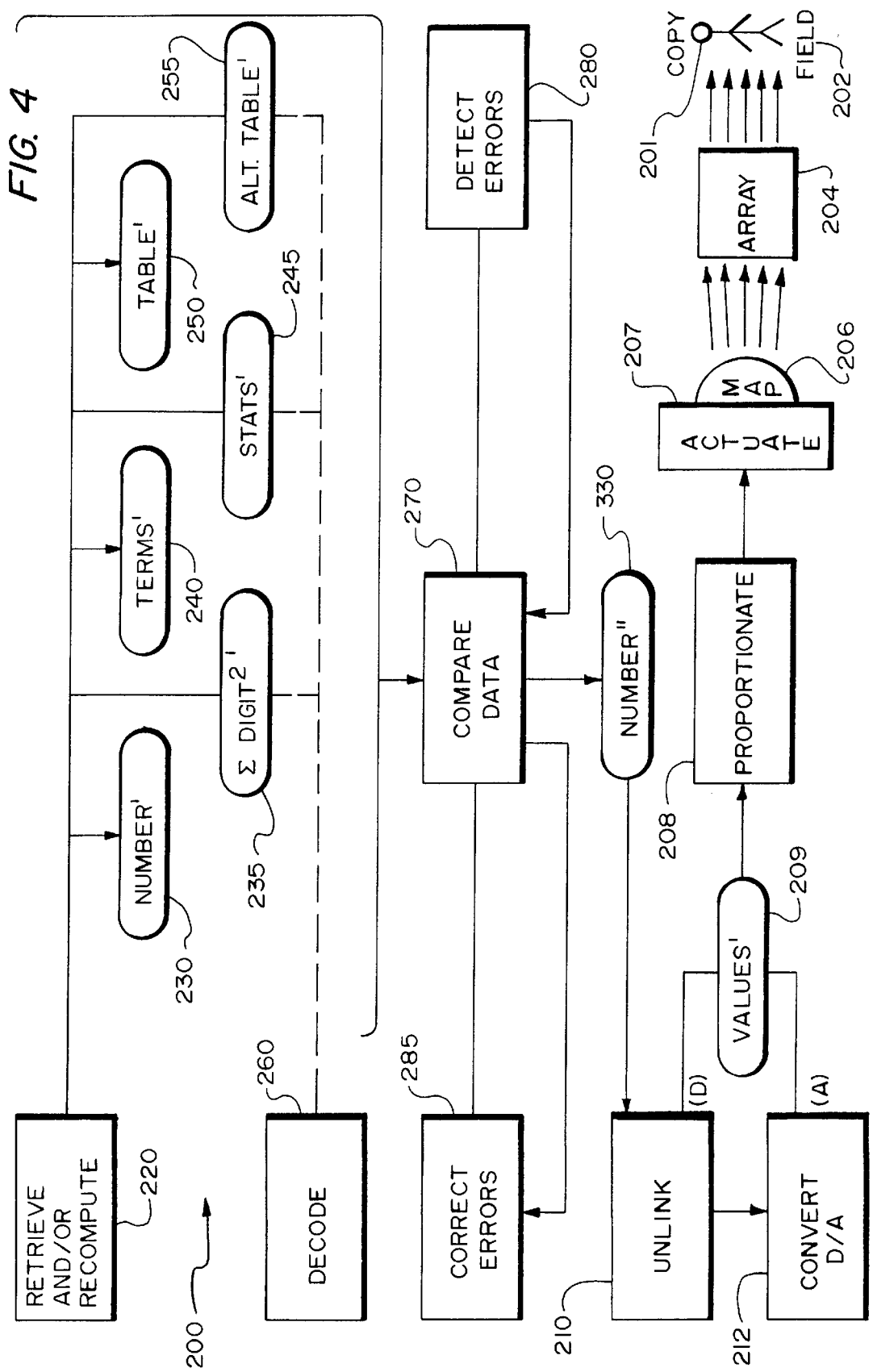
FIG. 4 is a schematic flow diagram representative of steps for receiving stored image data according to this invention.

FIG. 4 indicates schematically image-output or retrieval steps 200 of this invention, as the inverse of the foregoing input steps. The step RETRIEVE AND/OR RECOMPUTE 220 draws from the items already stored (or recomputes one or more from one or more of the others), such as NUMBER'230, partition TERMS'240, TABLE'250, $\Sigma$DIGIT$^2$, 235, STATS'245, and ALT. TABLE'255. (The primes note that these items may not be identical with the previous unprimed counterparts.)

If any of the last mentioned (or other) derivative items were coded for storage, it is usual to DECODE 260 (dashed lines) them at this stage. They and the other stored items (bracketed here) are then subjected to COMPARE DATA 270 in a DETECT ERRORS 280 loop (at right) and—where an error is detected—a CORRECT ERRORS 285 loop (at left), wherein error-free NUMBER"330 is identified by cross-checking concurrence as identical to stored NUMBER 130 (in FIG. 3).

Then, as suggested above, FIG. 4 schematically retraces steps (of the 200 series) in inverse order and function of the steps (of the 100 series) in that preceding view, as follows: to UNLINK 210, thus decatenating or unlinking retrieved NUMBER" 330 (=NUMBER 130) and converts its smaller numerical components into retrieved VALUES' 209, in either digital (D)—or via CONVERT D/A 212—analog form, whichever better suits the actuator being used. The final steps are to PROPORTIONATE 208 (setting the reproducing means) to ACTUATE 207 and MAP 206, sweeping (as suggested by arrows) ARRAY 204, and thereby producing stick figure image 201 in COPY FIELD 202 as a replica of starting stick FIG. 101 in original image field 102. The original resolution can at least be equaled, so a printed copy should be an exact replica of the original and thus equally helpful.

FIG. 5 shows all partition sets of the integer 15 (including the integer itself for convenience and by analogy with a null set), and shows the relative occurrence frequencies (or probabilities) of each of the numbers making up the various partition sets. These two tables exemplify the basis of the present number-theoretic approach to performing lossless data compression, storage, and retrieval.

Figure 6:
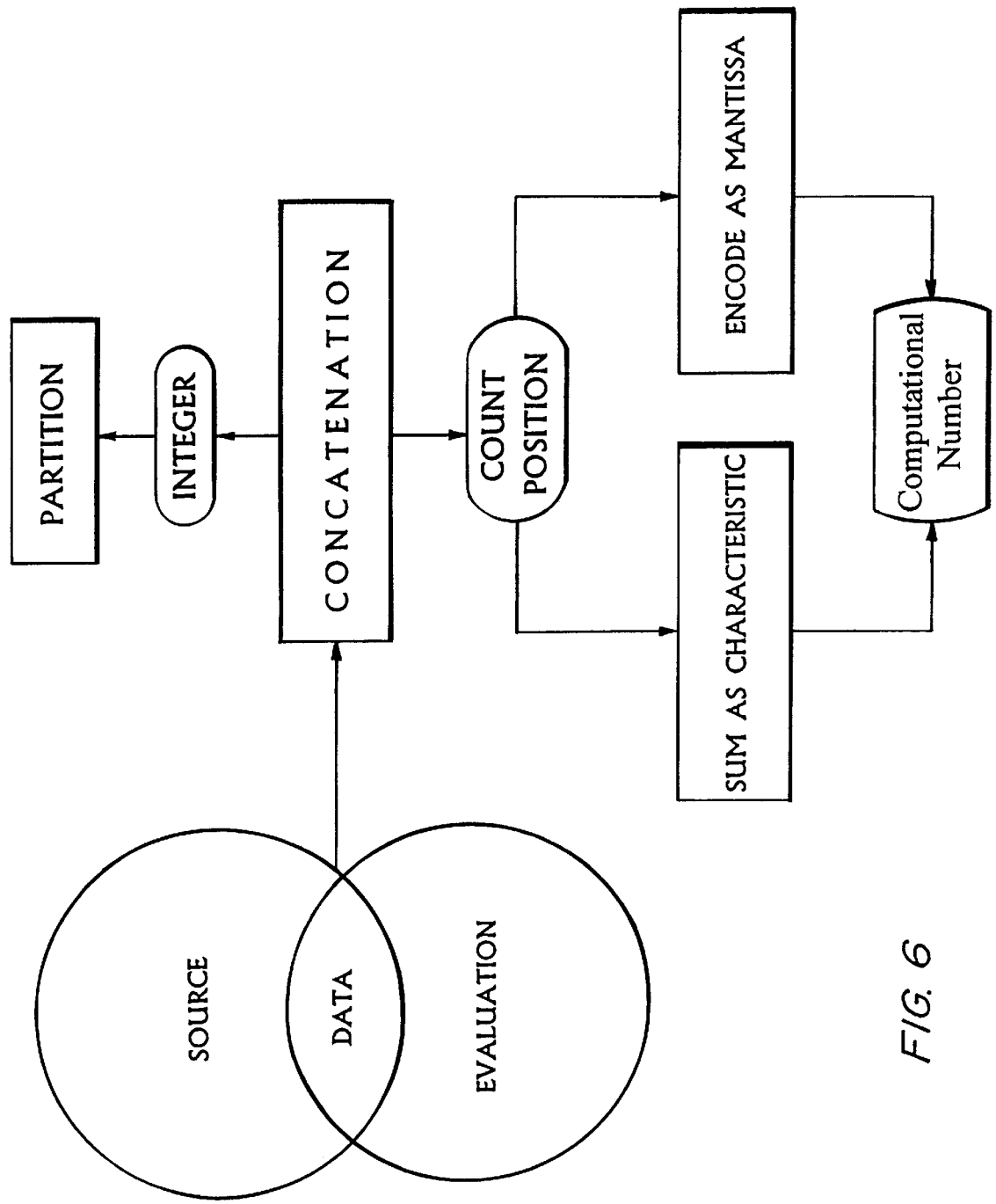
FIG. 6 is a schematic diagram illustrative of the processing of data values according to the present invention.

FIG. 6 shows, schematically, extended processing of image data, especially before and during storage thereof for later retrieval. At the left are interlinked circles labeled, respectively, SOURCE and EVALUATION, with their intersection marked DATA, clearly meaning evaluated source data—the starting material for image storage and retrieval. As indicated by the first arrow, the next important step is CONCATENATION, which is exemplified in the foregoing description.

Reading upward from CONCATENATION, the INTEGER resulting from such step is partitioned and is identifiable from its PARTITION set, as already described with regard to the first embodiment. Reading downward from CONCATENATION, another embodiment is shown, which may be supplementary, as for comparative purposes conducive to error detection/correction, or may be an alternative method of using such successive values without forming the single concatenated integer. The COUNT POSITION step is accomplished by starting at a given end of a concatenation of image values—without (or at preselected low) actual linkage, counting toward the far end and giving a preselected distinctive feature (such as a binary 1), whenever encountered, the value of its position count. The counts are totaled as indicated by the next step, SUM AS CHARACTERISTIC, the result being what may be called (by analogy with logarithm notation) the "characteristic"—at the left of a decimal point the computational number hereof.

FIG. 7 shows formation of the so-called "characteristic" part of such computational number, the integer found just left of a decimal point. This example is a second encoding of the exemplary image data values already matched to the lookup table of restricted partition sequence values summing to a characteristic of 15 as already shown in FIG. 5. and is presented here prefatory to further use of those previous values in exemplifying arithmetic encoding (deferred until FIG. 8). Whereas the position count may be of either 0 or 1 and may begin from either end, FIG. 7 uses the occurrences of 1 and reads from left to right. The resulting count summary is 8+15+16+22+24+30+31=146.—which as the so-called "characteristic" is set at the left of a decimal point. The part of the same computational number right of the decimal point (its "mantissa") remains to be encoded.

The ENCODE AS MANTISSA step (FIG. 6 far right) is performable conveniently on the position counts from the COUNT POSITION step. The preferred method, called here simply "arithmetic coding" is well described by Witten, Neal, and Cleary in their ARITHMETIC CODING FOR DATA COMPRESSION, COMMUNICATIONS of the ACM, vol. 30., no. 6, p. 500 et seq (June 1987). A computer program example is included there.

Figure 8:
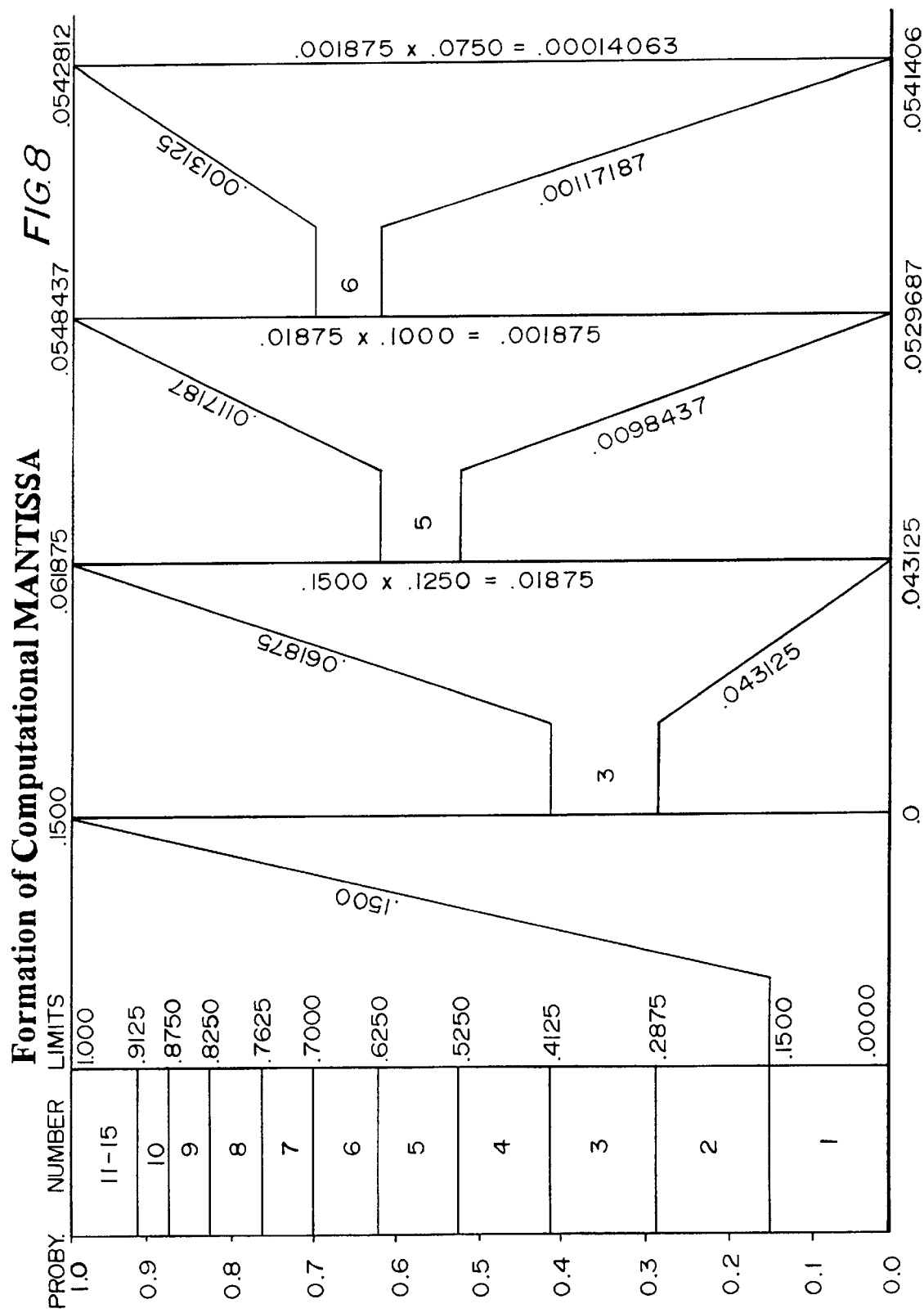
FIG. 8 illustrates schematically the arithmetic encoding of the non-integer (mantissa) portion of such computational number, with the aid of the tables of FIG. 5.

FIG. 8 shows an example of such arithmetic coding, performed on the seventh partition of 15 (shown in FIG. 6): 1, 3, 5, 6—selected for relative simplicity. The vertical 0 to 1 probability axis (tenths—with leading zeros, otherwise omitted) is at the left edge. Individual numbers in the set with their respective probabilities (15 deemed included) are next at the right. Numbers 11–15 and their small probabilities are grouped together solely for lack of space. The encoding computation fills the rest of the diagram at the right.

As 1 appears first in the (1, 3, 5, 6) partition, the line for the top of its probability range (0.1500) is extended horizontally to the right and slanted upward to the top of the graph to suggest that the probability segment for the next number is to be located as if that were the entire range available—as it is in such coding.

The probability limits (0.2875–0.4125) of the next number (3) are located in the range (vertical line) of the previous number (1), via multiplication by the previous range (0.1500), and the results noted numerically at the bottom (0.043125) and the top (0.061875) of that line, producing a new range (0.01875) for this second segment.

That range is then multiplied by the probability limits (0.5250 to 0.6250) of the next number (5) to get 0.0098437 at the bottom and 0.0117187 at the top, each of which is added to the previous base of 0.043125, to get 0.0529687 at the bottom and 0.0548437 at the top.

The last step in the arithmetic encoding shown in FIG. 8 is to multiply the range resulting (0.001875) for the previous number (5) by the probability limits (0.06250 to 0.7000) of the final number (6) to get two new incremental numbers (0.00117187 and 0.0013125), which when added to the previous bottom number 0.0529687) provide a final range from 0.0541406 at the bottom or low end to 0.0542812 at the top or high end of the final range segment (itself 0.00014063). The complete (characteristic.mantissa) number is expressed readily as 15.054211—where 0.054211 is the mean of the latter range limits.

Resizing of each successive segment, as in FIG. 7, is desirable for visible spatial representation of more than several segments. However, retrieval of coded numbers is simple enough for any number.

The final range numbers fall within the probability range (0.0 to 0.15) of the number 1, as would any number within their range, such as the mean, 0.0542109—say, 0.054211. Unlike a random message, the successive coded numbers here are monotonic, and their probability limits get progressively smaller (with occasional repetition). Knowing this, the decoder retraces the steps of the coder, by checking what next probability range limits would continue to bracket the number being decoded. The top limit of number 2 (0.2875) times the top limit for number 1 (0.1500) would produce a figure (0.043125), too small for the upper limit though possibly an acceptable lower limit for the next number (3) if its upper limit would bracket 0.054211, which it would, giving an upper limit of 0.4125×0.1500=0.061875. Progressive repetition then leads the decoder from number to number, until the successive encoded numbers have been decoded. One or more look-up tables may be prepared and stored instead of or in addition to such computation in the decoding process of such numbers, much as partition sets may form look-up tables for concatenated integers. No end signal is required as in ordinary arithmetic decoding because the sequencing stops when the sum equals the partitioned integer; the monotonic increase stops abruptly—or may restart for a new run.

FIG. 9 shows values for a three-dimensional (x,y,z) Scatterplot Example, having as variables MONTH, PAST, FUTURE. Both decimal and corresponding binary values are included, for each of six successive points or value combinations. These will be used illustratively in subsequent examples according to this invention. It should be understood that, although no sequential physical scanning need occur to obtain such data, something occurs in their selection process that may be deemed an equivalent of the evaluation step shown in FIG. 6.

Figure 10:
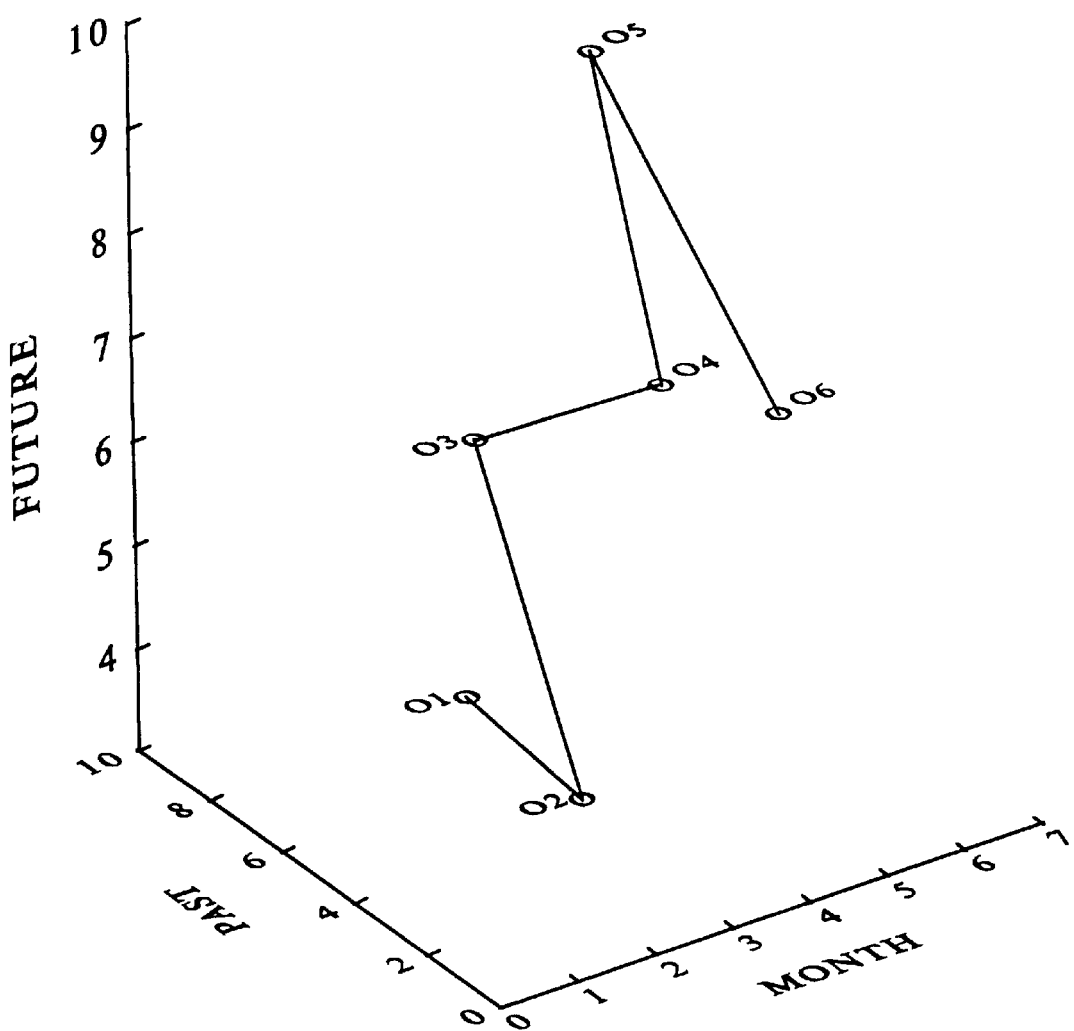
FIG. 10 is a graph of a three-dimensional scatterplot of the data of FIG. 9.

FIG. 10 shows a three-dimensional Scatterplot Graph of the data of FIG. 9 with a line interconnecting the values, themselves marked also as on to confirm the order of their occurrence. The MONTH n values are simply 1, 2, 3, 4, 5, and 6. They obviously form a fully packed partition (of 21) and need no further exposition here. The PAST and FUTURE values are not so orderly so are considered further.

As before, a prominent step is concatenation of the (y) values: 00000011, 00000010, 00000111, 00000100, 00001000, 00000101 (decimal 3, 2, 7, 4, 8, 5) into one or more number(s) subject to a preselected maximum. As $2^{24}$ is also in eight decimal figures (16,777,216) and 3 more doublings yield nine figures, a practical solution is to consider the first three points as a first number and the remaining points a second number: 000000110000001000000111, 000001000000100000000101. The first number amounts to $2^1+2^2+2^3+2^{10}+2^{17}+2^{18}$=2+4+8+1024+131,072+262,144= 394,254. The second number amounts to $2^1+2^3+2^{12}+2^{19}$= 2+8+4096+524,288=528,394. The half dozen corresponding (z) variables, successively 5, 4, 6, 7, 9, 6 and are treated similarly to the (y) variables, so 00000101, 00000100, 00000110, 00000111, 00001001, 0000110 become 000001010000010000000110, 000001110000100010000110. The first number amounts to $2^2+2^3+2^{11}+2^{17}+2^{19}$=4+8+2048+131,072+524,288=657, 420; the second becomes $2^2+2^3+2^8+2^{11}+2^{16}+2^{17}+2^{18}$=4+8+ 256+2048+65,536+131,072+262,144=461,068.

These integers may be processed according to this invention as in the previous scanned embodiment, for storage and, conversely, for retrieval—with replotting in the latter step replacing the former example's mapping step—as D/A reconversion becomes unnecessary.

Position counts, of 1, left to right, for respective variables: (8,15,23,24,30,38,40,46,47) for MONTH; (7,8,15,22,23,24, 30,37,46,48) for PAST; and (6,8,14,22,23,30,31,32,37,40, 46,47) for FUTURE. They sum, respectively, to 271 for MONTH, 260 for PAST, 336 for FUTURE, as the number characteristics. If the corresponding mantissas (not calculated here) are assumed to be 0.1234 . . . ; 0.5678 . . . ; 0.4837 . . . ; the resulting numbers are 271.1234 . . . ; 260.5678 . . . ; 336.4837 . . . .

A right-to-left position count also may be made of "1" digits, by adding their exponents, as for error detection and correction, and such computational number be calculated. Retrieved and decoded binary number groups for each such number should correspond error-free.

Alternative treatment of the scatterplot data might treat each of the six points separately, or together in successive combinations of two 3-tuples (x,y,z)—to limit the size of resulting integers: 135, 224 as 00000001,00000011, 00000101; 00000010,00000010,00000100; 376, 447 as 00000011,00000111,00000101; 00000100,00000100, 00000111; 589, 656 as 00000101,00001000,00001001; 00000110,00000101,00000110.

The position counts of the respective triple points from left to right give (8,15,16,22,24), (7,15,22); and (7,8,14,15, 16,22,24), (6,14,22,23,24); (6,8,13,21,24), (6,7,14,16,22, 23)=85, 44; 106, 89; and 72, 88; as respective CADAMA™ number characteristics. Their mantissas can be computed also by arithmetic coding, as shown above.

Figure 11:
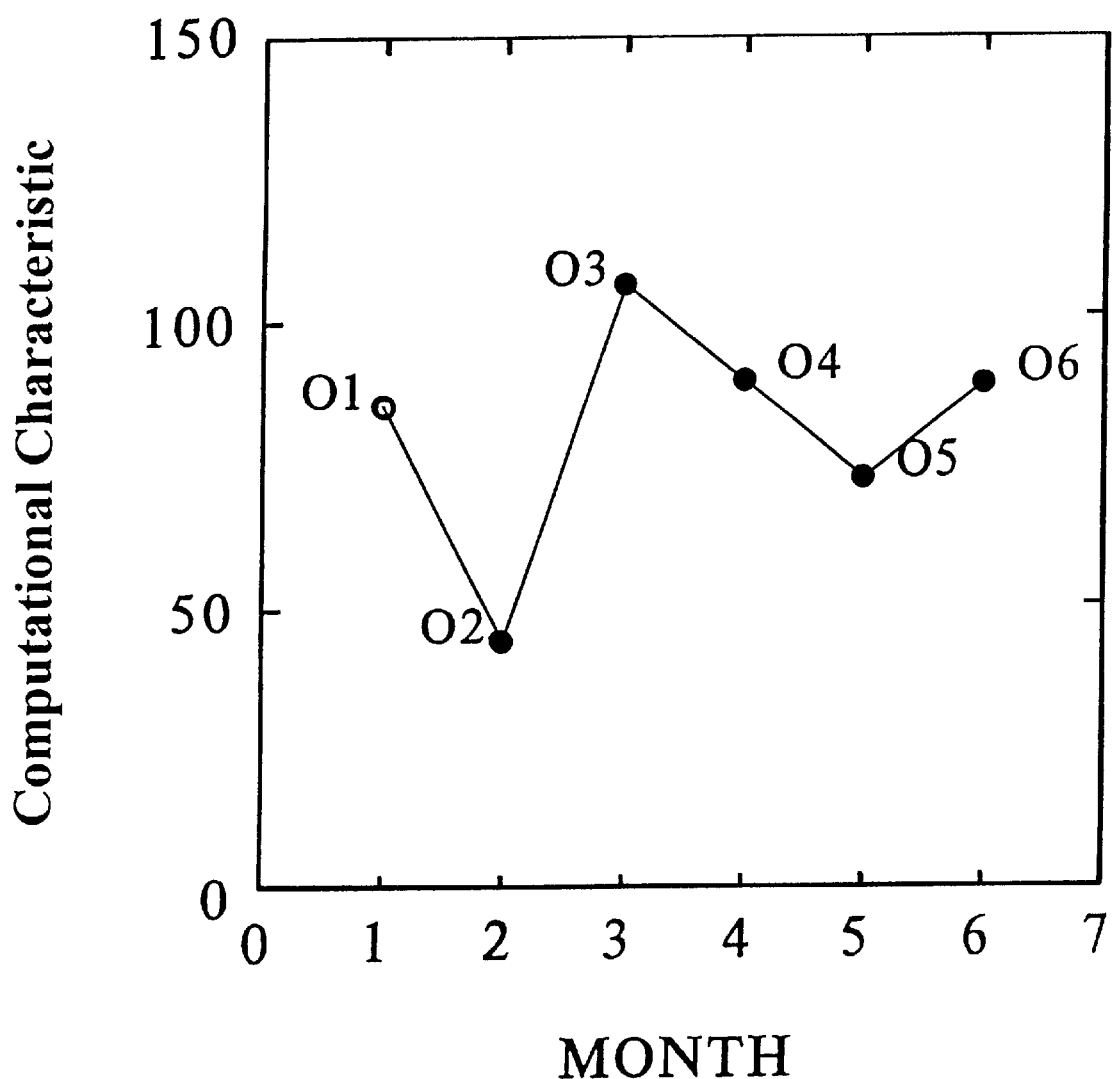
FIG. 11 is a graph of points corresponding to the points of the scatterplot of FIG. 10, after a degree of compression according to the present invention, in what may be considered as corresponding computational characteristic space.

FIG. 11 shows FIG. 9 corresponding points after compression to place them by months into such number (characteristic only) space. The plot zigzags from its starting point to a somewhat higher endpoint, with the third, fourth, and fifth point located in a straight line. The mantissa portions are not included in the graph.

The compression afforded by the concise characteristic of the CADAMA™ number and the efficient arithmetic encoding of its mantissa further extends the ability of the imaging system of this invention to handle data diversity, however originated, as on a number line, in two-dimensional space, three-dimensional or even higher spaces.

No unusual apparatus is required to practice this invention, and an operative set of physical components can be obtained readily in the marketplace. The user or operator has considerable control over the process and can tailor it to suit particular circumstances. The A/D conversion and D/A reconversion may be so accomplished with off-the-shelf apparatus, although it is also possible to dedicate to such purposes new apparatus especially so designed: e.g., transistor or similar circuitry to perform transformations from A/D and D/A and or broadly to perform unique one-to-one mapping of a finite binary string to the real number line (and vice versa), including mapping to integral numbers and a subset of real numbers: the computational numbers of the present numbers.

Whether to accept such resolution as is readily available or to demand very high levels of resolution, and whether to manipulate numbers of ordinary size in ordinary computational times or to process very large numbers or very rapidly (or both) are matters of choice.

The lossless imaging of this invention has obvious benefits, as noted. Other advantages and benefits may become apparent to persons who actually undertake to practice it in any of its various forms.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The claimed invention:

1. An imaging system including means evaluative of an image to provide sets of successive binary numerical data values of image features of interest, means to store data values, and means to retrieve stored data values, and digital computer means comprising linking means for concatenating each set of successive image data numerical values into a linked image data integer not exceeding N as a preselected largest permissible numerical integral value;

partition means adapted to partition each linked image data integer into at least one set of integral terms as summands summing to that integer, any given term being present only once in the set;

computation means adapted to identify all such partition sets of that integer and to calculate the respective probabilities of occurrence of each summand in all of the sets taken together;

position counting means adapted to form a number by summing the position counts of a selected binary digit (0 or 1) in the linked image data number and to place the sum just left of a decimal point;

arithmetic encoding means adapted to code the successive position counts by their respective probabilities of occurrence into a fractional value and to place it just right of the decimal point;

storage memory means for storing the resulting computational number, and means for retrieving and decoding the stored numbers;

unlinking means to decatenate each linked image data integer, when retrieved, into successive unlinked image data values;

mapping means adapted to restore the successive stored data values from the retrieved successive unlinked image data values; and graphic reproduction means to convert the restored data values into a replica of the image having the features of interest.

* * * * *